United States Patent [19]

Marshall et al.

[11] Patent Number: 5,272,832
[45] Date of Patent: Dec. 28, 1993

[54] TAMPER-RESISTANT BAIT STATION

[75] Inventors: Edward F. Marshall, Fredonia; Melanie S. Orth, Hartford; Harry B. Lansing, Racine, all of Wis.

[73] Assignee: Lipha, S.A., Lyons, France

[21] Appl. No.: 923,817

[22] Filed: Aug. 3, 1992

[51] Int. Cl.⁵ .............................................. A01M 1/20
[52] U.S. Cl. ..................................... 43/131; 220/326
[58] Field of Search ................... 43/131; 220/324, 326

[56] References Cited

U.S. PATENT DOCUMENTS

| | | | |
|---|---|---|---|
| 2,936,189 | 5/1960 | Pearson | 220/326 |
| 3,666,338 | 5/1972 | Russell | 220/326 |
| 4,026,064 | 5/1977 | Baker | 43/131 |
| 4,032,035 | 6/1977 | Tepas | 220/326 |
| 4,550,525 | 11/1985 | Baker | 43/131 |
| 4,637,162 | 1/1987 | Sherman | 43/131 |
| 4,648,201 | 3/1987 | Sherman | 43/131 |
| 4,833,819 | 5/1989 | Sherman | 43/131 |

Primary Examiner—Kurt C. Rowan
Attorney, Agent, or Firm—Foley & Lardner

[57] ABSTRACT

A bait station of the invention includes a container having an opening permitting a target pest to enter and exit, an internal chamber for storing a bait together with a pesticide, a lid which can be opened to permit direct access to the internal chamber, and three manually-releasable locking mechanisms capable of securing the lid to the container. The locking mechanisms are simultaneously actuated in order to release the lid from the container, and are spaced from each other by a distance sufficient to prevent a child from opening two of the locking mechanisms with one hand and the third with the other hand, but close enough to permit an adult to do so. The user must touch all three mechanisms and lift the lid at the same time to open the lid.

12 Claims, 1 Drawing Sheet

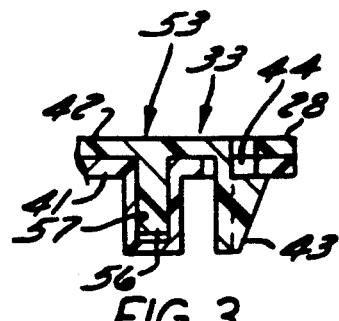
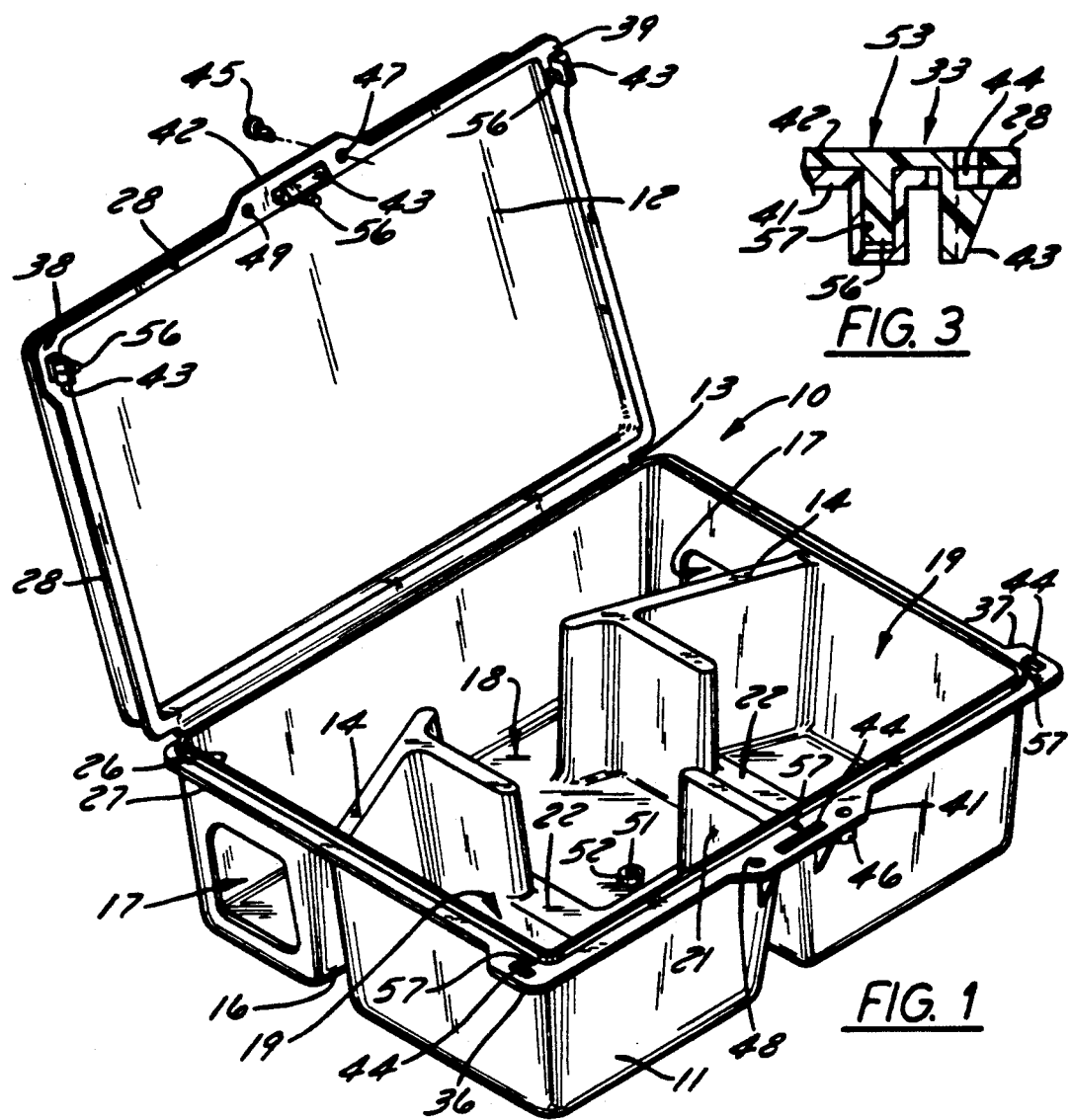
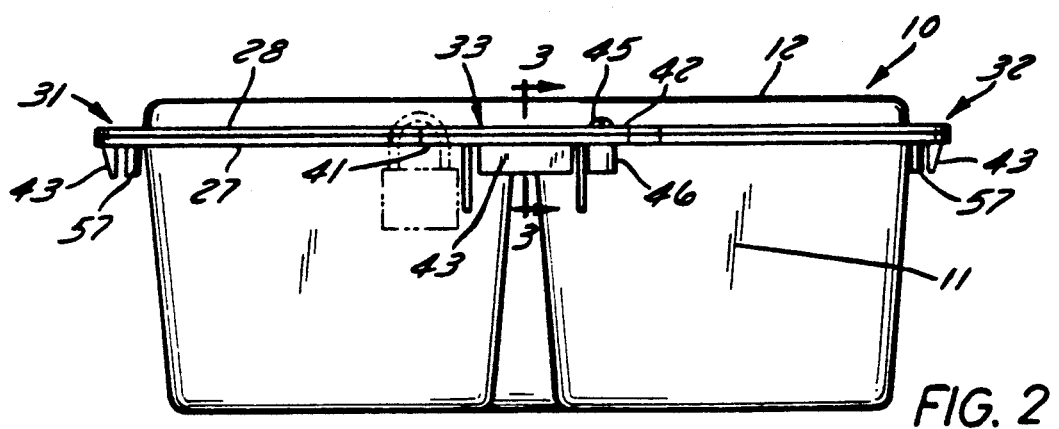

TAMPER-RESISTANT BAIT STATION

TECHNICAL FIELD

This invention relates to a bait stations used in pest extermination, particularly for extermination of rodents.

BACKGROUND OF THE INVENTION

A variety of rodent bait stations are presently in commercial use. Generally, known bait stations provide an enclosure having one or more openings therein for the target animal to enter. A rodenticide is placed within the station, often mixed with a feed as bait. The target rodents enter the station in search of food, consume or contact the poison, and later die after leaving the station.

In one form of commercially available prior art station, the enclosure comprises a rectangular container made of rigid plastic integrally molded with a lid. The container has two rat- or mouse-sized holes in opposing positions on opposite sides of the container, and has internal walls providing a passage from one opening to the other. An opening near the center of the passage permits the target animal to turn the corner and enter a chamber containing the bait and rodenticide. The lid is secured in a closed position after the station is loaded with the bait and rodenticide. A weak spot is molded on the bottom of the container to permit the bait station to be nailed or spiked in position.

Such bait stations are designed for compliance with EPA guidelines. The latter generally require the station to: (1) be impervious to weather, (2) lockable, (3) be resistant to breakage by larger non-target animals, (4) be child resistant, i.e., the interior walls should be designed to prevent a child from reaching in the entrance and pulling out the poisoned bait, (5) be capable of being anchored or secured in place, (6) have holes sized to prevent larger, non-target animals such as dogs and cats from entering, (7) be capable of displaying warnings, and (8) not present an attractive appearance to children. To make the bait station lockable, known bait stations provide a screw-and-socket arrangement whereby the lid can be secured to the container with a screw that is difficult to remove. The lid and bottom portion have also been provided with alignable holes through which a padlock can be placed. These measures render the station lockable, but opening the station in order to reload it becomes more difficult when the lid is padlocked or screwed shut. The present invention provides a more convenient system for locking the bait station which does not require use of a separate fastener such as a padlock or screw.

SUMMARY OF THE INVENTION

A bait station of the invention includes a container having an opening permitting a target pest to enter and exit, an internal chamber for storing a bait together with a pesticide, a lid which can be opened to permit direct access to the internal chamber, and three manually-releasable locking mechanisms capable of securing the lid to the container. The locking mechanisms are preferably of the type that must be simultaneously actuated in order to release the lid from the container, and are spaced from each other by a distance sufficient to prevent a child from opening two of the locking mechanisms with one hand and the third with the other hand, but close enough to permit an adult to do so. The container preferably includes one or more internal partition walls that isolate the internal chamber from the side opening(s), requiring the target pest, such as a rat or mouse, to crawl through the passage to reach the internal chamber.

According to a preferred aspect of the invention, each locking mechanism comprises a releasable latch, for example, a resilient barbed prong formed on a peripheral flange of one of either the lid and the container, and a slot formed in the other. The barbed prong catches on the underside of the flange when inserted through the slot and is releasable from the slot by pressing on the prong while lifting the lid. The user must press on all three prongs and lift or push up the lid in order to open the station. If one prong is released, it returns to an undeformed position and prevents the lid from being raised.

A method of exterminating a rodent (or other pest) using a bait station of the invention accordingly includes the steps of opening the lid of the bait station by simultaneously manually releasing all three of the locking mechanisms and raising the lid, loading the internal chamber with a bait and a rodenticide, and closing the lid and locking the locking mechanisms. If the station is not already deployed, it is also placed in a location frequented by rodents and optionally secured against removal by attachment to a support or nearby fixture, such as a floor.

BRIEF DESCRIPTION OF THE DRAWINGS

The invention will be described with reference to the accompanying drawings, wherein like numerals denote like elements, and:

FIG. 1 is a perspective view of a bait station according to the invention;

FIG. 2 is a front view of the bait station of FIG. 1, with the lid closed and locked; and FIG. 3 is a partial, sectional view taken along the line 3—3 in FIG. 2.

DETAILED DESCRIPTION OF PREFERRED EMBODIMENTS

Referring to FIGS. 1 to 3, a bait station 10 according to the invention includes a rectangular tray or container 11 integrally formed with a lid 12 by injection molding, in a manner well known in the art. Lid 12 is united to container 11 by a flexible living hinge 13. Container 11 has a pair of opposed, symmetrical partition walls or baffles 14 which are formed by creating upraised portions and corresponding recesses 16 in the bottom of container 11. Recesses 16 can be used to aid in stacking bait stations 10. Container 11 further has a pair of opposed openings 17 in its side walls sized to permit rats to enter and exit the station but exclude animals larger than rats from entering. Walls 14 are spaced to provide a passage 18 therebetween that permits rats to enter through one of holes 17, then turn the corner into passage 18 in order to reach a pair of bait chambers 19 at the front corners of container 11. Chambers 19 are divided from each other by a median wall 21. A pair of L-shaped, low partial walls 22 running from median wall 21 to each of walls 14 help retain the bait within chambers 19 while still permitting the rodent to reach the poisoned bait.

Container 11 has a rectangular upper rim 26 having a C-shaped, peripheral lateral flange 27 along the front and sides of container 11. Lid 12 similarly has a C-shaped, peripheral lateral flange 28 of like dimensions along its bottom about its front and sides. In its closed position, lid 12 fits over rim 26 so that flanges 27, 28 contact and mate with each other about the front and sides of container 11.

Container 11 has three releasable locking mechanisms 31, 32, and 33 in accordance with the invention located at the left front corner, right front corner, and center of the front of container 11, respectively. Each locking mechanism 31-33 may comprise a latch mechanism including a resilient barbed prong that is inserted through a groove and must be pushed back in order to be withdrawn from the groove. In particular, flange 27 has lateral extensions or tabs 36, 37 located near its front corners, and flange 28 has corresponding tabs 38, 39 near its front corners. Flanges 27, 28 further have a third pair of tabs 41, 42 located about halfway between tabs 36, 38 and tabs 37, 39, respectively. As illustrated in FIG. 3, each tab 36, 37, 41 has a resilient barbed prong 43 that is retained within a groove 44 in the other tab 38, 39 or 42. Tabs 41, 42 may also have a socket 46 and hole 47 for screwing down lid 12 with a self-tapping screw 45, and/or a pair of aligned holes 48, 49 for locking down lid 12 with a padlock for additional security.

Each locking mechanism or catch 31, 32, 33 includes the corresponding flanges, prongs and grooves. Mechanisms 31, 32, and 33 are spaced from each other, and proper spacing is essential to obtaining a lockable, tamper-resistant closure. Two of mechanisms 31-33 should be sufficiently close together that an adult hand, using a thumb and forefinger on the same hand, can release both prongs 43 simultaneously. At the same time, the user releases the third prong 43 with the other hand and lifts lid 12. However, no two of catches 31-33 should be close together enough to permit a child to open two of them with one hand. For this purpose, at least two of catches 31-33 are spaced by about 13 to 20 cm, especially about 14 to 18 cm, and the third of the locking mechanisms 31-33 is spaced the same or greater distance from each of the other two. In particular, catches 31-33 are conveniently equally spaced from each other to accommodate right or left-handed users, but the third catch could be located further than 20 cm from the nearest of the other two, such as at a location part way along one side. In the illustrated embodiment, container 11 is about 27 cm by 32 cm at its upper opening, and lid 12 has similar dimensions.

Station 10 is moldable as a single unit, and as such may be made of plastic or a similar material which has the strength needed to resist breakage, but is flexible and resilient enough to form prongs 43. Molded polypropylene has proven highly suitable.

In use, bait station 10 may first be secured to a floor, a support, or the like in a location frequented by rodents, such as garages, warehouses, and commerical buildings, by driving a nail or spike through a weakened portion 51 surrounded by a reinforced collar 52 and located at the center of the bottom wall of container 11. The poisoned bait is placed in chambers 19. The bait may be any commercially available type, such as rodenticidal meal or gnawable bait blocks. The rodenticide may be mixed into the bait, or a separate rodenticide such as tracking powder may be used. Lid 12 is closed, and each prong 43 is inserted into its associated groove 44 to lock down lid 12. Station 10 may later be reopened for re-use or refilling by pressing on all three of prongs 43 and lifting the lid, as described above.

Lid 12 has a tendency to bow during opening as one of prongs 43 is pressed, sometimes causing release of another prong 43. To prevent this, each locking mechanism 31-33 may further be provided with a guide device 53 that helps prevent the locking mechanism from bending and popping open. For example, as shown in FIG. 3, a pin 56 extending downwardly from tab 42 from behind prong 43 fits closely within an aligned socket 57 formed on the underside of tab 41.

It will be understood that the foregoing description is of preferred exemplary embodiments of the invention, and that the invention is not limited to the specific forms shown. For example, a container having the tamper-resistant locking system of the invention can be used for purposes other than as a bait station, such as for storage of medicines, valuables or other objects that need to be kept away from children. For such purposes, the side openings would be omitted. Likewise, other well known manually releasable locking mechanisms, such as a spring-loaded button or lever release, could be used as the locking mechanism. These and other modifications may be made in the design and arrangement of the elements without departing from the scope of the invention as expressed in the appended claims.

We claim:

1. A bait station of the type including a container having an opening permitting a target pest to enter and exit, an internal chamber for storing a bait together with a pesticide, and a lid which can be opened to permit direct access to the internal chamber, wherein the improvement comprises:

three manually-releasable locking mechanisms capable of securing the lid to the container, which mechanisms are of the type that must be simultaneously actuated in order to release the lid from the container, and which mechanisms are spaced from each other by a distance sufficient to prevent a child from opening any two of the locking mechanisms with one hand and the third with the other, while allowing an adult to do so, wherein the container has a bottom wall and side walls, the lid is secured to the container by a hinge along the upper edge of one of the side walls, and the locking mechanisms are located in a row along the outer periphery of the lid away from the hinge and along the side walls of the container away from the hinge.

2. The bait station of claim 1, wherein the locking mechanisms comprise resilient plastic catches integrally molded with the lid and container.

3. The bait station of claim 2, wherein the hinge is made of thin, flexible plastic and is integrally molded with the lid and container.

4. A bait station, comprising:

a plastic container having a side opening sized to permit a target rodent to enter and exit and preventing an animal larger than the target rodent from entering, and an internal chamber for storing a bait together with a pesticide;

a lid united with the container by a flexible plastic hinge running along a top rear edge of the container on a side wall thereof, which lid can be opened to permit direct access to the internal chamber;

three manually-releasable locking mechanisms capable of securing the lid to the container, which mechanisms comprises catches of the type that must be simultaneously actuated in order to release the lid from the container, and which catches are spaced from each other by a distance sufficient to prevent a child from opening any two of the catches with one hand and the third with the other, while allowing an adult to do so, each catch comprising a resilient barbed prong formed on one of the lid and a side wall of the container, and a slot formed in the other of the lid and a side wall of the container, the barbed prong catching on the underside of the associated slot when inserted through the slot and being releasable from the slot by pressing on the prong while lifting the lid, and each slot and barbed prong are disposed on mating exterior lateral peripheral flanges of the container and lid, and wherein the container, lid, hinge, and catches are integrally molded from a resilient plastic.

5. The bait station of claim 4, wherein the releasable locking mechanisms are located at spaced positions along the front of the container.

6. The bait station of claim 4, wherein two of the locking mechanisms are spaced from each other by from about 13 to 20 cm, and the third locking mechanism is spaced the same or greater distance from each of the other two.

7. The bait station of claim 5, wherein two of the locking mechanisms are spaced from each other by from about 14 to 18 cm, and the third locking mechanism is spaced the same or greater distance from each of the other two.

8. The bait station of claim 5, wherein the releasable locking mechanisms are located near left and right front corners of the container and at a central position directly between the front corners.

9. The bait station of claim 4, wherein the container further comprises internal partitions defining a passage through which the target rodent can enter the internal chamber from the side opening.

10. The bait station of claim 4, wherein the mating lateral flanges have three pairs of laterally extending tabs extending therefrom, and each slot and barbed prong are disposed on mating pairs of the tabs at positions laterally outside of the remainder of the flanges.

11. The bait station of claim 10, wherein one of the sets of tabs further includes a pair of aligned holes suitable for locking the flanges together with a lock at a position spaced from the associated slot and barbed prong.

12. The bait station of claim 10, wherein one of the sets of tabs further includes a hole and socket aligned with each other suitable for locking the flanges together with a screw inserted through the hole into the socket.

* * * * *